(12) United States Patent
Kuo et al.

(10) Patent No.: US 8,931,941 B2
(45) Date of Patent: Jan. 13, 2015

(54) VEHICULAR LIGHT-EMITTING DIODE LIGHT PROVIDING UNIFORM WIDER ILLUMINATION

(71) Applicant: Tong Yah Electronic Technology Co., Ltd., Tainan (TW)

(72) Inventors: Chih-Chien Kuo, Tainan (TW); Chiung-Ying Wang, Tainan (TW)

(73) Assignee: Tong Yah Electronic Technology Co., Ltd., Tainan (TW)

( * ) Notice: Subject to any disclaimer, the term of this patent is extended or adjusted under 35 U.S.C. 154(b) by 0 days.

(21) Appl. No.: 13/845,201

(22) Filed: Mar. 18, 2013

(65) Prior Publication Data

US 2013/0322107 A1    Dec. 5, 2013

(30) Foreign Application Priority Data

May 30, 2012  (TW) .............................. 101210381 U

(51) Int. Cl.
*F21S 8/10*    (2006.01)
*B60Q 1/26*    (2006.01)

(52) U.S. Cl.
CPC ............... *F21S 48/00* (2013.01); *B60Q 1/2657* (2013.01); *B60Q 1/2696* (2013.01)
USPC ............ 362/546; 362/545; 362/509; 362/235

(58) Field of Classification Search
USPC .................. 362/546, 277, 612, 613, 509, 545
See application file for complete search history.

(56) References Cited

U.S. PATENT DOCUMENTS

| | | | | |
|---|---|---|---|---|
| 4,733,335 | A * | 3/1988 | Serizawa et al. | 362/503 |
| 4,935,665 | A * | 6/1990 | Murata | 313/500 |
| 6,149,288 | A * | 11/2000 | Huang | 362/545 |
| 6,846,101 | B2 * | 1/2005 | Coushaine | 362/517 |
| 7,607,808 | B2 * | 10/2009 | Birman et al. | 362/489 |
| 2004/0124487 | A1 * | 7/2004 | Loh | 257/433 |
| 2011/0085336 | A1 * | 4/2011 | Blumel et al. | 362/255 |
| 2011/0141745 | A1 * | 6/2011 | Gu et al. | 362/311.02 |
| 2012/0049733 | A1 * | 3/2012 | Gallai et al. | 315/32 |

* cited by examiner

*Primary Examiner* — Sikha Roy
(74) *Attorney, Agent, or Firm* — Rosenberg, Klein & Lee

(57) ABSTRACT

A vehicular light includes a body having a base. A cover is mounted to a surface of the base and made of transparent material. A circuit board is mounted in the base. A light emitting element is mounted to the circuit board. An intermediate member is mounted between the cover and the circuit board. The intermediate member includes a light transmittable section covering the light emitting element. A frame is mounted between the light transmittable section and the light emitting element and has a substantially bowl-shaped inner side. The frame and the intermediate member are separable from each other and detachable from the cover and the circuit board. The frame includes a frame wall. A through-hole is formed in a bottom of the frame. The light emitting element extends through the through-hole and received in the frame and faces the light transmittable section.

3 Claims, 5 Drawing Sheets

PRIOP ART

VEHICULAR LIGHT-EMITTING DIODE LIGHT PROVIDING UNIFORM WIDER ILLUMINATION

BACKGROUND OF THE INVENTION

The present invention relates to a vehicular light and, more particularly, to a vehicular light providing uniform, wider illumination.

Vehicular lights provide vehicles with warning, indication, and illumination functions as well as decorative and other functions. Decorations can be bonded to vehicular lights, such as headlights, flickering lights, and direction indicator lamps, to provide decorative functions. Nevertheless, the specification of the vehicular lights must meet legal requirements and pass tests for road safety.

FIG. 5 shows a conventional vehicular light including a body 5 having a base 51. A cover 6 made of transparent material is mounted to a surface of the base 51. A circuit board 511 is mounted in the base 51. Two light emitting elements 512 are mounted to the circuit 511. Two protrusions 61 are formed on an inner side of the cover 6 and correspond to the light emitting elements 512. The protrusions 61 provide non-plane reflection for the light beams from the light emitting elements 512, such that the light beams provide illumination in a uniform or wider manner. Each protrusion 61 includes a socket 611 at a bottom thereof and having a downwardly-facing opening for receiving one of the light emitting elements 512, avoiding escape of the light beams.

However, the protrusions 61 are integrally formed with the lamp 6 such that the whole cover 6 must be replaced if the number or position of the light emitting elements 512 is changed, resulting in a waste of time and costs.

WO 2005/001332 A1 discloses a light for a vehicle including a light emitter and a light guiding body. A protrusion protrudes from a lower portion of the light guiding body. A socket is defined in a bottom of the protrusion and receives a light emitter. However, the protrusion is integrally formed with the light guiding body such that the whole cover must be replaced if the number or position of the light emitter is changed, resulting in a waste of time and costs.

Thus, a need exists for a novel vehicular light that mitigates and/or obviates the above disadvantages.

BRIEF SUMMARY OF THE INVENTION

The above need is fulfilled by providing a vehicular light including a body having a base. A cover is mounted to a surface of the base and made of transparent material. A circuit board is mounted in the base. A light emitting element is mounted to the circuit board. An intermediate member is mounted between the cover and the circuit board. The intermediate member includes a light transmittable section covering the light emitting element. A frame is mounted between the light transmittable section and the light emitting element and has a substantially bowl-shaped inner side. The frame and the intermediate member are separable from each other and detachable from the cover and the circuit board. The frame includes a frame wall. A through-hole is formed in a bottom of the frame. The light emitting element extends through the through-hole and received in the frame and faces the light transmittable section.

Since the intermediate member and the frame can be separated and detached, in a case that the position or number of the light emitting element on the circuit board is changed, the cover can still be used. When only the position of the light emitting element is changed, a user can only replace the intermediate member without replacing the frame and the cover. Thus, the time and costs can be saved while providing more choices for the user in the position and number of the light emitting element.

In an example, the lighting element is a light-emitted diode. A recess is formed in a top face of the light transmitting section. A protrusion is formed on a bottom side of the light transmitting section and aligned with the recess and has a shape corresponding to the recess. The frame wall of the frame further includes two lateral supporting walls extending upward from a top portion thereof. The lateral supporting walls clamp two sides of the intermediate member. In another example, an inner side of the frame wall of the frame is a reflective surface.

The present invention will become clearer in light of the following detailed description of illustrative embodiments of this invention described in connection with the drawings.

DETAILED DESCRIPTION OF THE INVENTION

Figure 1:
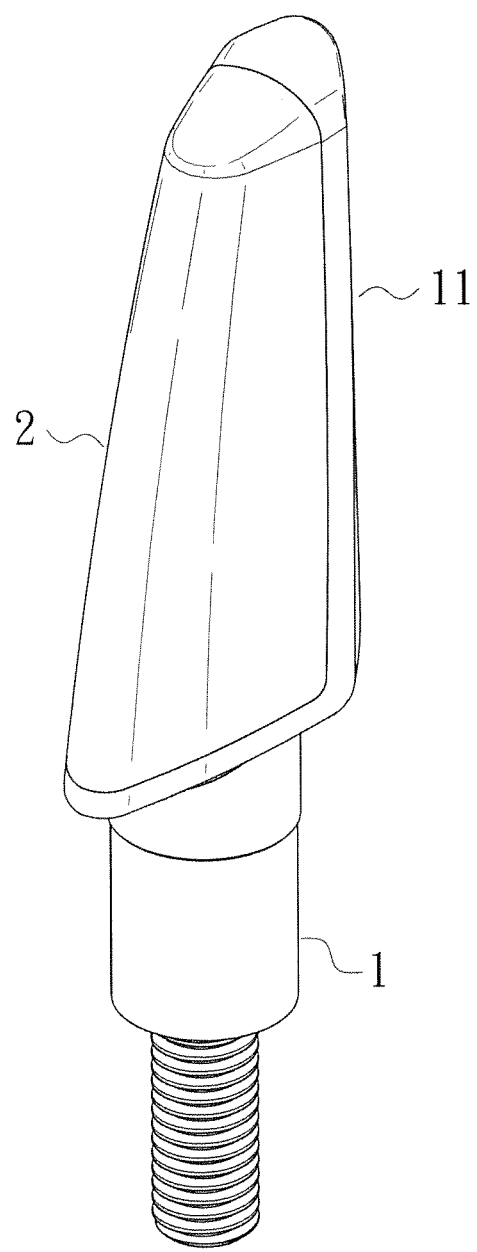
FIG. 1 is a perspective view of a vehicular light according to the present invention.
Figure 2:
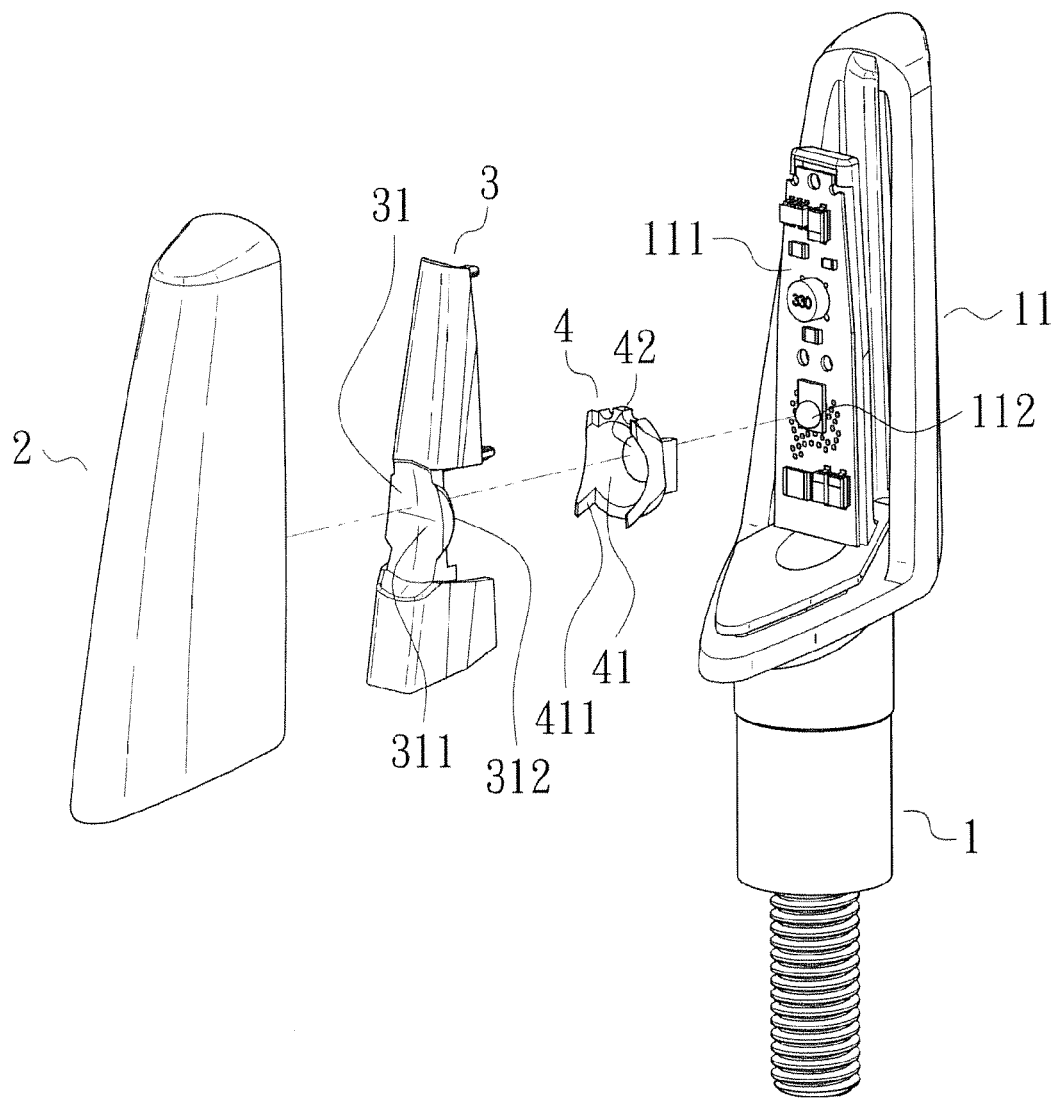
FIG. 2 is an exploded, perspective view of the vehicular light according to the present invention.
Figure 3:
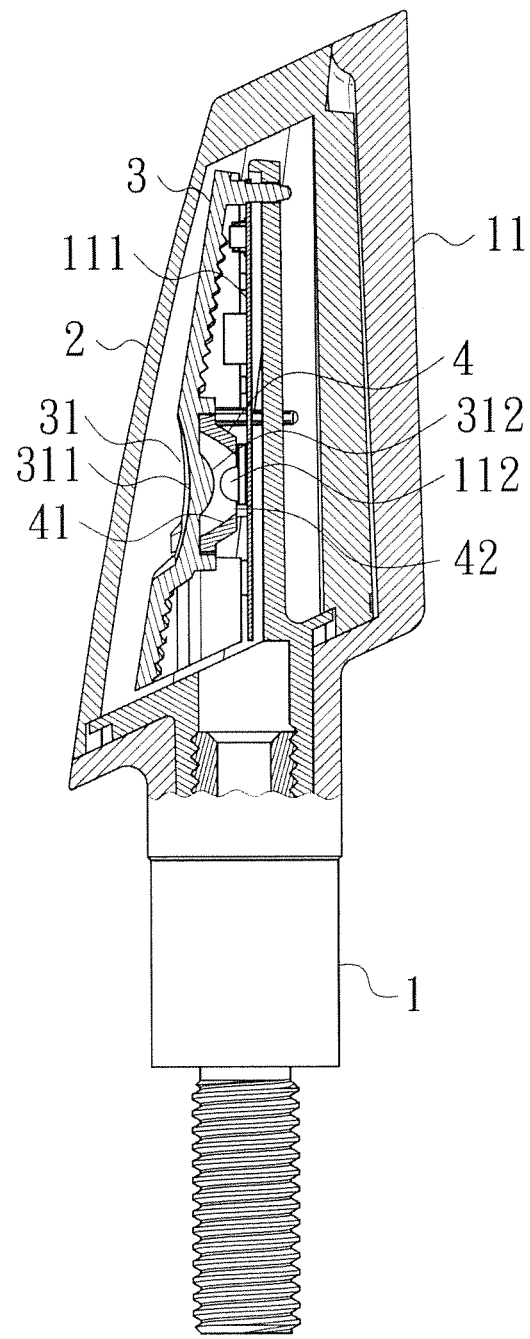
FIG. 3 is a cross sectional view of the vehicular light according to the present invention.

With reference to FIGS. 1-3, a vehicular light according to the present invention includes a body 1 having a base 11. A circuit board 111 is mounted in the base 11. A light emitting element 112 is mounted to the circuit board 111. A cover 2 is mounted to a surface of the base 11 and made of transparent material.

A separate, intermediate member 3 is mounted between the cover 2 and the circuit board 111. The intermediate member 3 includes a light transmittable section 31 covering the light emitting element 112. A frame 4 is mounted between the light transmittable section 31 and the light emitting element 112 and has a substantially bowl-shaped inner side. The frame 4 and the intermediate member 3 are separable from each other and detachable from the cover 2 and the circuit board 111. Furthermore, the frame 4 includes a frame wall 41. A through-hole 42 is formed in a bottom of the frame 4. The light emitting element 112 extends through the through-hole 42 and is received in the frame 4 and faces the light transmittable section 31.

Since the intermediate member 3 and the frame 4 can be separated and detached, in a case that the position or number of the light emitting element 112 on the circuit board 111 is changed, the cover 21 can still be used. Specifically, in a case that only the position of the light emitting element 112 is changed, a user can only replace the intermediate member 3 without replacing the frame 4 and the cover 21. In another case that the vehicular light uses more than one light emitting element 112, the vehicular light can use an intermediate member 13 having a corresponding number of light transmittable sections 31 and a corresponding number of frames 4 without replacing the cover 21. Thus, the time and costs can be saved while providing more choices for the user in the position and number of the light emitting element 112.

The light emitting element 112 is a light-emitted diode in this embodiment. Since the light beams emitted from the light-emitted diode are straightforward and, thus, difficult to be projected onto the inner surface of the cover 2 having a wider area, a uniform halo effect of reflective light beams can not be obtained. To avoid this advantage, a recess 311 is formed in a top face of the light transmitting section 31, and a protrusion 312 is formed on a bottom side of the light transmitting section 31 and aligned with the recess 311 and has a shape corresponding to the recess. By such an arrangement, the light beams emitted from the lighting element 112 can be reflected (non-plane reflection) to provide more uniform or wider illumination.

The frame wall 41 of the frame 4 can further include two lateral supporting walls 411 extending upward from a top portion thereof. The lateral supporting walls 411 clamp two sides of the intermediate member 3 to increase the assembling stability between the frame 4 and the intermediate member 3.

Figure 4:
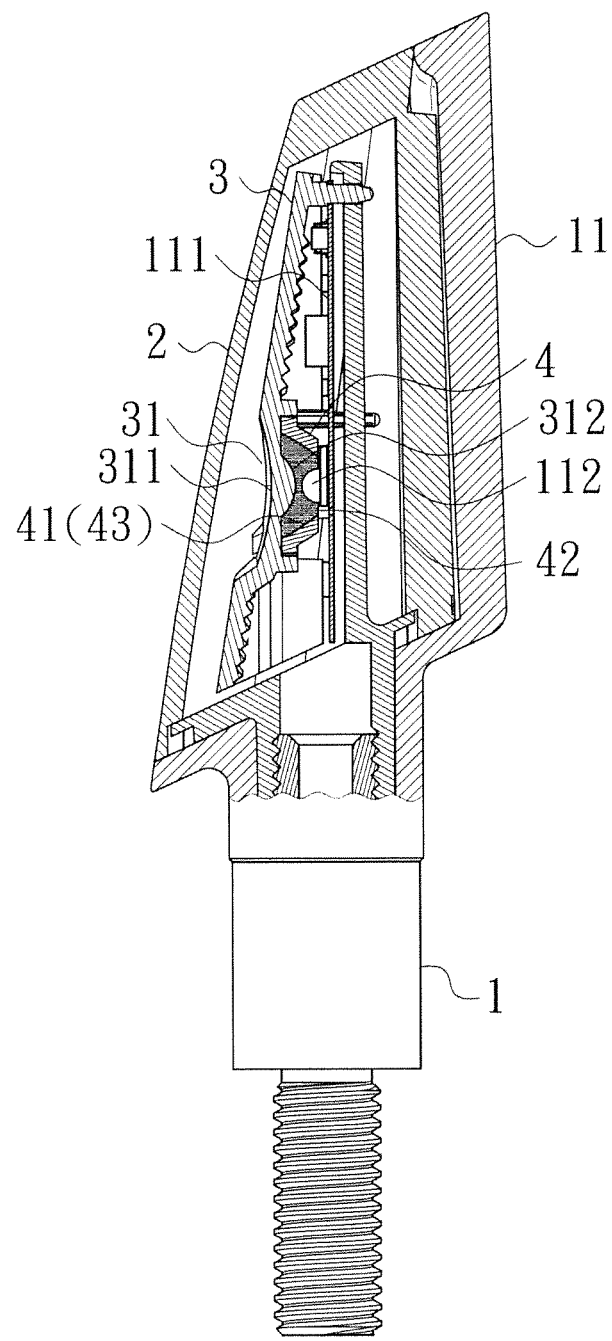
FIG. 4 is a cross sectional view illustrating another embodiment of the vehicular light according to the present invention, with the vehicular light including a frame having a frame wall with a reflective surface on an inner side thereof.
Figure 5:
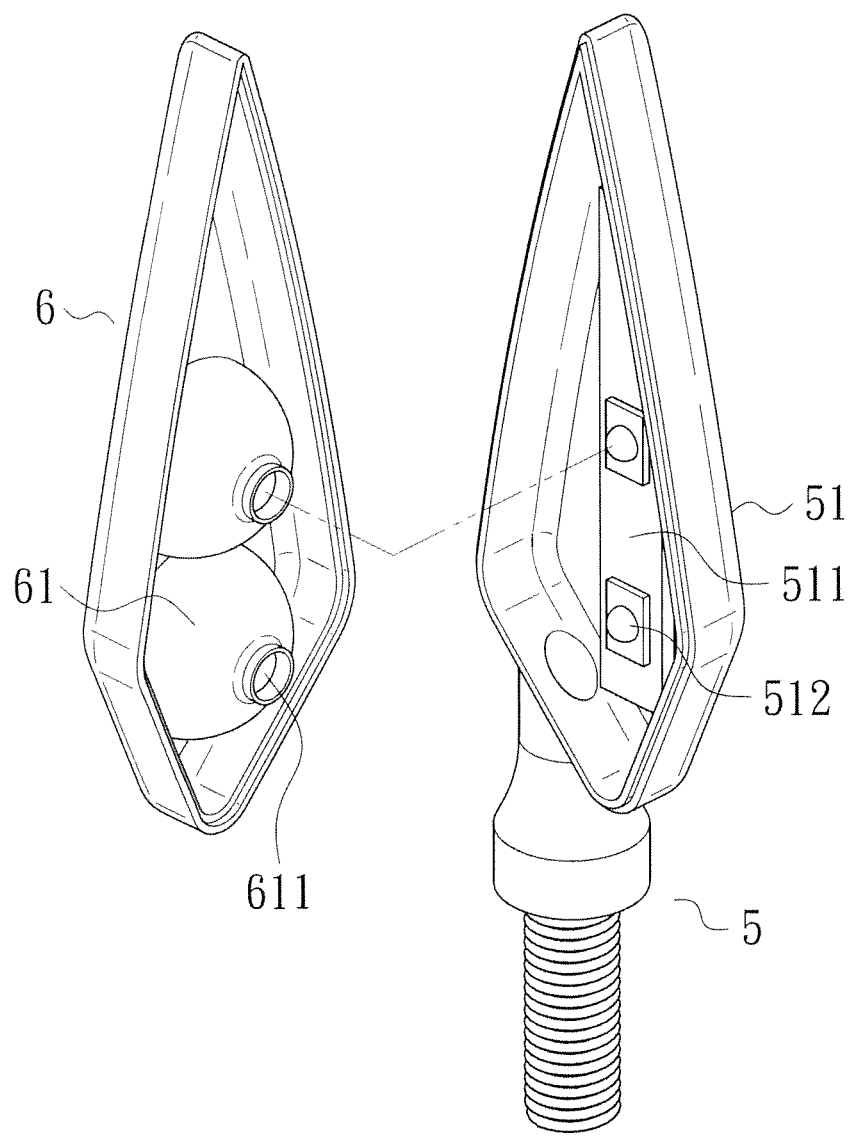
FIG. 5 is a cross sectional view of a conventional vehicular light.

In an embodiment shown in FIG. 4, an inner side of the frame wall 41 of the frame 4 is a reflective surface 43. The light beams from the light emitting element 112 are reflected by the reflective surface and pass through the light transmittable section 31, providing enhanced lumen.

Since the light emitting efficiency of currently available light-emitted diodes is increased, excellent illuminating efficiency can be provided in a limited space in the vehicular light by the combination of the above structure and the light-emitting diodes. The light illuminating efficiency of the vehicular light also meets the requirements of European vehicle safety standards.

Tests (RCE R50 Category 11 & 12 (LED)) have been made on a vehicular light according to the present invention and a comparative vehicular light (made by Kellermann GmbH) under the same conditions. The testing distance is 3.19 m. The voltage of the light-emitted diodes is 13.5 V. Table 1 shows test results of the vehicular light according to the present invention (hereinafter referred to as "Example", and Table 2 shows test results of the vehicular light made by Kellermann GmbH (hereinafter referred to as "Comparative example").

TABLE 1

| Function | Min | Max | Value | H | V | Unit |
|---|---|---|---|---|---|---|
| H-V (1 min) | 90 | 350 | 251.400 | 0.00° | 0.00° | cd |
| H-V (30 min) | 90 | 350 | 253.000 | 0.00° | 0.00° | cd |
| 10U-5L | 18 | 350 | 64.760 | −5.00° | 10.00° | cd |
| 10U-5R | 18 | 350 | 66.450 | 5.00° | 10.00° | cd |
| 5U-20R | 9 | 350 | 13.450 | 20.00° | 5.00° | cd |
| 5U-10R | 18 | 350 | 92.600 | 10.00 | 5.00° | cd |
| 5U-V | 63 | 350 | 198.300 | 0.00° | 5.00° | cd |
| 5U-10L | 18 | 350 | 91.000 | −10.00° | 5.00° | cd |
| 5U-20L | 9 | 350 | 13.100 | −20.00° | 5.00° | cd |
| H-10L | 31.5 | 350 | 115.600 | −10.00° | 0.00° | cd |
| H-5L | 81 | 350 | 226.600 | −5.00° | 0.00° | cd |
| H-5R | 81 | 350 | 217.000 | 5.00° | 0.00° | cd |
| H-10R | 31.5 | 350 | 117.200 | 10.00° | 0.00° | cd |
| 5D-20R | 9 | 350 | 14.220 | 20.00° | −5.00° | cd |
| 5D-10R | 18 | 350 | 99.100 | 10.00° | −5.00° | cd |
| 5D-V | 63 | 350 | 223.300 | 0.00° | −5.00° | cd |
| 5D-10L | 18 | 350 | 110.000 | −10.00° | −5.00° | cd |
| 5D-20L | 9 | 350 | 15.270 | −20.00° | −5.00° | cd |
| 10D-5L | 18 | 350 | 101.300 | −5.00° | −10.00° | cd |
| 10D-5R | 18 | 350 | 100.700 | 5.00° | −10.00° | cd |
| Visibility | 0.3 | 350 | (0.187) | (−18.00°) | (−11.00°) | cd |
|  |  |  | 248.341 | 59.5° | 0.00° |  |

TABLE 2

| Function | Min | Max | Value | H | V | Unit |
|---|---|---|---|---|---|---|
| H-V (1 min) | 90 | 350 | 124.800 | 0.00° | 0.00° | cd |
| H-V (30 min) | 90 | 350 | 123.300 | 0.00° | 0.00° | cd |
| 10U-5L | 18 | 350 | 48.050 | −5.00° | 10.00° | cd |
| 10U-5R | 18 | 350 | 45.930 | 5.00° | 10.00° | cd |
| 5U-20R | 9 | 350 | 19.930 | 20.00° | 5.00° | cd |
| 5U-10R | 18 | 350 | 51.090 | 10.00° | 5.00° | cd |
| 5U-V | 63 | 350 | 94.500 | 0.00° | 5.00° | cd |
| 5U-10L | 18 | 350 | 48.630 | −10.00° | 5.00° | cd |
| 5U-20L | 9 | 350 | 20.970 | −20.00° | 5.00° | cd |
| H-10L | 31.5 | 350 | 61.210 | −10.00 | 0.00° | cd |
| H-5L | 81 | 350 | 97.000 | −5.00° | 0.00° | cd |
| H-5R | 81 | 350 | 100.100 | 5.00° | 0.00° | cd |
| H-10R | 31.5 | 350 | 65.670 | 10.00° | 0.00° | cd |
| 5D-20R | 9 | 350 | 20.000 | 20.00° | −5.00° | cd |
| 5D-10R | 18 | 350 | 61.110 | 10.00° | −5.00 | cd |
| 5D-V | 63 | 350 | 109.300 | 0.00° | −5.00 | cd |
| 5D-10L | 18 | 350 | 54.370 | −10.00° | −5.00° | cd |
| 5D-20L | 9 | 350 | 20.190 | −20.00° | −5.00° | cd |
| 10D-5L | 18 | 350 | 53.370 | −5.00° | −10.00° | cd |
| 10D-5R | 18 | 350 | 58.310 | 5.00° | −10.00° | cd |
| Visibility | 0.3 | 350 | (1.738) | (−54.25°) | (9.00°) | cd |
|  |  |  | 118.217 | 0.75° | −1.00° |  |

As can be seen from Tables 1 and 2, the candelas (cd) of the Example are higher than those of the Comparative example in the following items: H-V (1 min), H-V (30 min), 10U-5L, 10U-5R, 5U-10R, 5U-V, 5U-10L, H-10L, H-5L, H-5R, H-10R, 5D-10R, 5D-V, 5D-10L, 10D-5L, 10D-5R, and VISIBILITY. The visibility test on the Example was conducted in an area having the smallest brightness (0.187). The visibility test on the Comparative example was conducted in an area having the largest brightness (1.738).

In view of the foregoing, the vehicular light according to the present invention saves time and costs for the user while providing more choices for the user in the position and number of the light emitting element 112. Furthermore, the vehicular light according to the present invention provides enhanced illumination and meets the requirements of vehicle safety standards.

Although specific embodiments have been illustrated and described, numerous modifications and variations are still possible without departing from the scope of the invention. The scope of the invention is limited by the accompanying claims.

The invention claimed is:
1. A vehicular lamp comprising:
a body including a base, with a cover mounted to a surface of the base and made of transparent material, with a circuit board mounted in the base, with a light emitting element mounted to the circuit board, with an intermediate member mounted between the cover and the circuit board, with the intermediate member including a light transmittable section covering the light emitting element, with a frame mounted between the light transmittable section and the light emitting element and having a substantially bowl-shaped inner side, with the frame and the intermediate member being separable from each other and detachable from the cover and the circuit board, with the frame including a frame wall, with a through-hole formed in a bottom of the frame, with the light emitting element extending through the through-hole and received in the frame and facing the light transmittable section;
with the lighting element being a light-emitting diode, with a recess formed in a top face of the light transmitting section, with a protrusion formed on a bottom side of the light transmitting section and aligned with the recess and having a shape corresponding to the recess.

2. The vehicular lamp as claimed in claim 1, with the frame wall of the frame further including two lateral supporting walls extending upward from a top portion thereof, with the two lateral supporting walls clamping two sides of the intermediate member.

3. The vehicular lamp as claimed in claim 1, with the frame wall of the frame having an inner side, with the inner side of the frame wall of the frame being a reflective surface.

* * * * *